United States Patent [19]

Roberts et al.

[11] 3,953,630

[45] Apr. 27, 1976

[54] LAMINATED TRANSPARENT ASSEMBLIES

[75] Inventors: William Gary Roberts, West Hagley; Robert Burns, Leigh, both of England

[73] Assignee: Triplex Safety Glass Company Limited, London, England

[22] Filed: Mar. 8, 1973

[21] Appl. No.: 339,036

[30] Foreign Application Priority Data
Mar. 13, 1972  United Kingdom............... 11621/72

[52] U.S. Cl.................................... 428/38; 428/81; 428/99; 428/192
[51] Int. Cl.[2].......................................... B60J 1/00
[58] Field of Search ............... 161/93, 98, 149, 192, 161/198, 199; 428/38, 45, 46, 81, 99, 192, 437; 156/106, 107

[56] References Cited
UNITED STATES PATENTS

| | | | |
|---|---|---|---|
| 2,552,955 | 5/1951 | Gaiser et al..................... | 161/199 X |
| 2,750,312 | 6/1956 | Bloom, Jr. et al. ............. | 161/199 X |
| 3,261,739 | 7/1966 | Porter............................. | 161/199 X |
| 3,424,642 | 1/1969 | Orcutt............................ | 161/199 X |
| 3,616,122 | 10/1971 | Orcutt............................ | 161/199 X |

Primary Examiner—William J. Van Balen
Assistant Examiner—William R. Dixon, Jr.
Attorney, Agent, or Firm—Burns, Doane, Swecker & Mathis

[57] ABSTRACT

A laminated transparent assembly suitable for use as a windscreen for a high speed vehicle, e.g. an aircraft or railway locomotive, comprises a load bearing sheet of toughened glass having a second sheet of glass laminated thereto by means of an impact resistant interlayer of plastics material, e.g. polyvinylbutyral, and an insert of high tensile strength flexible material which extends around the periphery of the interlayer and which has an inner part embedded in the outer marginal portion of the interlayer in a plane parallel to the surfaces of the interlayer, and an outer part extending outwardly beyond the edges of the interlayer to provide for attachment of the assembly to the structure of the vehicle. The insert is preferably a sheet of fabric material, e.g. a fabric woven from rubber-impregnated glass fibre cords and nylon, with the glass fibre cords substantially perpendicular to the adjacent edges of the assembly, embedded between layers of soft polyvinylbutyral. The outer part of the insert may have a flexible portion adjacent to the edges of the interlayer and an outer marginal portion which is reinforced, e.g. with metal, to render it rigid to provide means for attachment of the assembly to the vehicle structure.

18 Claims, 12 Drawing Figures

LAMINATED TRANSPARENT ASSEMBLIES

BACKGROUND OF THE INVENTION

1. Field of the Invention

This invention relates to laminated transparent assemblies suitable for use as windscreen for high speed vehicles such as aircraft or railway locomotives.

2. Description of the Prior Art

A known form of aircraft windscreen comprises the following components:

A thick inner sheet of highly toughened glass which carries major loads due to internal pressurisation of the aircraft whilst in flight.

A thinner outer sheet of highly or lightly toughened glass which is usually provided with a transparent elecro-conductive film on its inner surface, power being applied to the film to provide heat primarily for de-icing and demisting of the surface of the windscreen when in service.

A thick interlayer of a plastics material such as polyvinylbutyral bonding the inner and outer sheets of glass together.

In another known form of aircraft windscreen two thick sheets of highly toughened glass are laminated together with a thick interlayer of plastics material therebetween.

In the kind of aircraft windscreen which includes these two forms and which in more general terms comprises at least two sheets of glass bonded together by a thick plastics interlayer, the interlayer has been adapted to provide for edge location of the windscreen in the aircraft structure. In one such case the edge of the interlayer projects beyond the periphery of the sheets of glass and a metal strip, for example of aluminum or stainless steel, is bonded in the projecting marginal portion of the interlayer in a plane substantially parallel to the surfaces of the windscreen. Mounting holes are drilled through the projecting edges of the interlayer and the metal strip, for bolting the windscreen to the edges of an opening in the aircraft structure.

The interlayer is generally heated to an optimum temperature in service, for example by the medium of the electroconductive film mentioned above. The interlayer plays two major structural roles.

If the windscreen is struck by a bird whilst the aircraft is in flight the dynamic loading can cause failure of the glass components of the windscreen. In this case the interlayer deforms inwardly and the kinetic energy of the bird is absorbed by deformation of the interlayer. This deformation leads to considerable loads at the located edge of the interlayer. The metal strip which is embedded in the edges of the interlayer reinforces the interlayer against the loads which arise.

Aircraft windscreens also have to be designed in such a manner that in the event of failure of the glass components when the aircraft is at high altitudes depressurisation of the aircraft is prevented. The provision of an interlayer reinforced and bolted at its edges to the aircraft structure gives such protection. With the glass components failed and with the interlayer at its optimum temperature, the interlayer can deform outwards into a "ballon" shape thus resisting the internal pressurisation for long enough for the aircraft to descend to an altitude at which internal pressurisation is no longer necessary.

However the use of a reinforcing metal insert embedded in the edges of the interlayer of the windscreen as described above is known to have a deleterious effect on windscreen reliability. The materials used in the windscreen construction have different physical properties relative to each other and relative to the material of the surrounding aircraft structure. Differences between the thermal expansion co-efficients of the materials involved in a particularly relevant factor. In the range of environmental temperatures experienced in aircraft usage, the glass components of the windscreen will expand and contract thermally relative one to another and relative to the aircraft structure. In particular, because the edges of the interlayer in the windscreen are rigidly located with respect to the aircraft structure by the metal insert, thermal expansion and contraction of the interlayer relative to the aircraft structure can give rise to stresses at the edges of the interlayer. Such stresses are also contributed to by thermal expansion and contraction of the glass components of the windscreen relative to the interlayer and by mechanical deformation of the windscreen and the aircraft structure under the loads experienced in flight. Such thermally and mechanically induced stresses can cause the phenomena known as "delamination" and "cold chipping". The stresses give rise to shear forces at the interface between the interlayer and the inner surface of the glass sheets around the edges of the windscreen. "Delamination" occurs when the shear forces which arise are sufficiently high to cause failure of the adhesive bond between the glass surfaces and the interlayer at the edges of the windscreen. On the other hand if the adhesive bond between the glass surfaces and the interlayer is sufficiently strong to resist delamination, failure can occur by chipping of the edges of the glass sheets by tensile stressing.

The risk of delamination and/or cold chipping is enhanced if the edges of the heated windscreen are allowed to become very cold when the aircraft is flying at high altitude, in very low ambient temperatures. The presence of a metal insert in the marginal portion of the interlayer of the windscreen, which insert has a thermal conductivity much higher than that of the interlayer, serves to extract heat from the edges of the windscreen. This results in the setting up of a temperature gradient across the edges of the windscreen giving rise to further differential thermal stress between the glass components and the interlayer of the windscreen which increases the likelihood of delamination or cold chipping at the edges of the windscreen.

SUMMARY OF THE INVENTION

The invention has for object to reduce or eliminate some or all of the above-mentioned disadvantages.

According to the invention a laminated transparent assembly, suitable for use as a windscreen in a high speed vehicle such as an aircraft, comprises a load bearing sheet of toughened glass having a second sheet of glass laminated thereto by means of an impact resistant interlayer of plastics material, and an insert of high tensile strength flexible material which extends around the periphery of the interlayer and which has an inner part embedded in the outer marginal portion of the interlayer in a plane parallel to the surfaces of the interlayer, and an outer part extending outwardly beyond the edges of the interlayer to provide for attachment of the assembly to the structure of the vehicle. The high strength and flexibility of the material of the insert makes it possible to attach the assembly, through the insert, to the vehicle structure in a strong and reliable manner. The insert gives the attachment an inherent flexibility which reduces or eliminates the thermally and mechanically induced stresses mentioned above.

Preferably the insert is of a non-metallic material having a low thermal conductivity, so that little heat is extracted through it from the edges of the windscreen and the differential thermal stress mentioned above is also reduced.

The outer part of the insert preferably comprises a flexible portion adjacent to the edges of the interlayer and an outer marginal portion which is reinforced so as to render it substantially rigid to provide means for attachment of the assembly to the structure of the vehicle.

In a preferred arrangement, the insert comprises a sheet of fabric material.

Preferably the insert comprises a sheet of a fabric woven from rubber-impregnated glass fibre cords and nylon, which is located in the assembly so that the impregnated glass fibre cords make an angle of 90° ± 15° with the adjacent edges of the assembly. alternatively the insert may comprise a sheet formed of rubber-impregnated glass fibre cords laid substantially parallel to one another, which is located in the assembly so that the glass fibre cords make an angle of 90° ± 15° with the adjacent edges of the assembly. In either of these cases, the sheet is preferably provided on each side with a layer of plastics material of similar nature to, but softer than, the material of the interlayer, e.g. polyvinylbutyral. The rubber-impregnated glass fibre cords have a high tensile strength which is effectively utilized in this arrangement for attachment of the assembly to the vehicle structure.

In another alternative embodiment of the invention, the insert comprises at least one sheet of woven glass fibre material. In this case, the woven glass fibre material preferably has substantially equal strengths in both the weft and warp directions and is located in the assembly so that these directions make angles of substantially 45° with the adjacent edges of the assembly.

Other materials, such as fabrics of polyester fibres or stainless steel wire mesh, may also be used for the insert, if desired.

The outer marginal portion of the fabric sheet is preferably reinforced and formed into a rigid composite laminate to provide the means for attachment of the assembly to the structure of the vehicle. Preferably the outer marginal portion of the fabric sheet is laminated together with sheets of metal.

The laminated transparent assembly may be mounted in a surrounding frame structure with spacing between the edges of the assembly and the frame structure, the laminated outer marginal portion of the fabric sheet being attached to the frame structure, which provides for attachment of the assembly to the structure of the vehicle.

In a particular arrangement the frame structure comprises a support frame and a retaining member together defining a channel in the frame structure housing the edges of the assembly, an interspace being defined between the edges of the assembly and the channel in the frame structure, said interspace being filled with an elastomeric sealing material, the laminated outer marginal portion of the fabric sheet being rigidly clamped between the support frame and the retaining member of the frame structure. Preferably the flexible portion of the outwardly extending part of the insert is disposed at an angle to the embedded inner part and to the rigid outer marginal portion, which are parallel to one another. This arrangement imparts additional flexibility to the mounting and reduces still further the possibility that thermally and mechanically induced stresses might give rise to shear forces at the interface between the interlayer and the glass sheets.

BRIEF DESCRIPTION OF THE DRAWINGS

FIG. 3 is a sectional elevation along the line III—III in FIG. 1, FIGS. 4, 5, 6, 7 and 8 are each a section similar to FIG. 1 through an edge portion of alternative forms of laminated glass assembly in accordance with the invention.

DETAILED DESCRIPTION OF THE INVENTION

Figure 1:
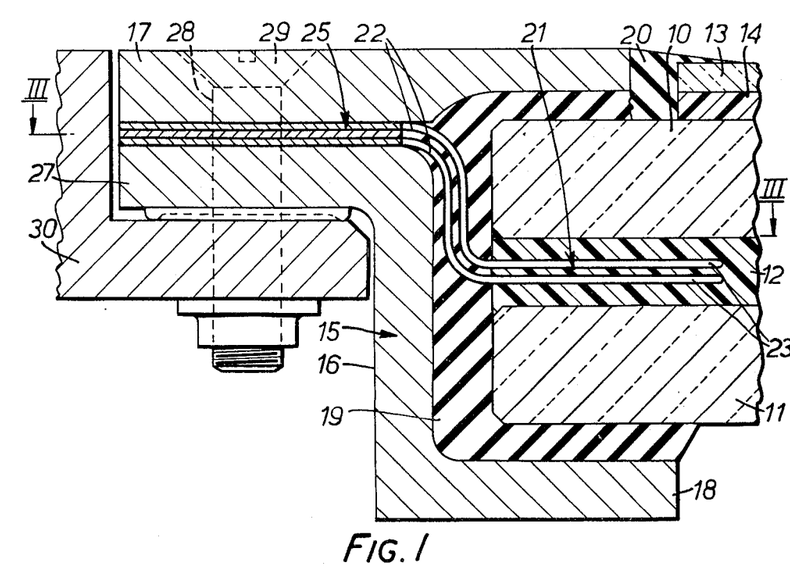
FIG. 1 is a section through an edge portion of a laminated glass assembly in accordance with the invention.

Referring to FIG. 1 of the drawings, a laminated glass assembly comprises two similarly shaped sheets 10, 11 of soda-lime-silica glass, which are both 12 mm thick and are bonded together by a 7.5 mm thick interlayer 12 of hard polyvinylbutyral therebetween. Each sheet 10, 11 is toughened to make the assembly suitable for use for example as a windscreen in an aircraft or other high speed vehicle and in this embodiment has a modulus of rupture of 2500 Kg/cm$^2$.

Toughening of each sheet 10, 11 may be achieved by the method of British Pat. No. 1,215,954 comprising heating the glass to a temperature near to its softening point and then toughening the heated glass by heat exchange with an oil held at a temperature below the boiling point of the oil, there being maintained in the oil a proportion of up to 4% by weight of a liquid having a boiling point lower, e.g. at least 100° C lower, than the boiling point of the oil. For example as disclosed in British Pat. No. 1,282,720 there may be maintained in the oil from 0.01% to 0.07% of the low boiling point liquid.

It is to be appreciated that each sheet 10, 11 is toughened to a degree necessary to suit the practical requirements of the assembly. In the embodiment of FIG. 1 the modulus of rupture of the toughened sheets may be varied in the range 2000 Kg/cm$^2$ to 3500 Kg/cm$^2$ so as to meet the requirement for resistance against impact by a bird or other object when the assembly is employed as a windscreen in a high speed aircraft or other vehicle.

Alternatively the sheets 10, 11 may be toughened by the method of British Pat. No. 1,253,681 wherein each of the sheets 10, 11 is heated to an initial temperature near its softening point and is then subjected to a preliminary cooling of its major surfaces with a gaseous chilling medium e.g. air, and is then quenched by immediate immersion in a chilling liquid. In this case the hot glass is subjected to the preliminary cooling by the gaseous cooling medium under conditions which establish a centre to surface temperataure gradient in the glass sheet whilst retaining the centre temperature near to the initial temperature of heating as the glass enters the chilling liquid.

The sheet 10 is also bonded to an additional glass sheet 13 by a 3 mm thick interlayer 14 of hard polyvinyl butyral therebetween. The sheet 13 is 3 mm thick and is toughened by conventional thermal means e.g. by cooling of the surfaces of the heated sheet by means of a gaseous chilling medium, e.g. air to give the sheet 13 a modulus of rupture of 900 to 1900 Kg/cm$^2$. Alternatively the sheet 13 may be toughened by the methods described above for toughening of the sheets 10 and 11.

The laminated assembly of the glass sheets 10, 11, 13 and the polyvinyl butyral interlayers 12, 14 is mounted in a surrounding frame srructure 15. The frame structure 15, which is fabricated from aluminum alloy, comprises an inner base frame 16 and an outer retaining ring 17.

The peripheral edges of the glass sheets 10 and 11 in the laminated assembly fit in the frame structure 15 between the retaining ring 17 and an inwardly extending flange 18 of the base frame 16. An interspace existing between the peripheral edges of the glass sheets 10, 11 and the frame structure 15 is filled with injection moulded silicone rubber sealing material 19. The edges of the glass sheet 13 and the interlayer 14 are set back with respect to the edges of the glass sheet 10 in order to form a rebate for reception of the inner edges of the retaining ring 17. The inner edges of the retaining ring 17 terminate short of the edges of the glass sheet 13 and the interlayer 14 to leave a gap which is filled with polysulphide rubber sealing material 20. The sealing material 20 bends to the edges of the glass sheet 13 and the retaining ring 17 to form a weather seal.

Figure 2:
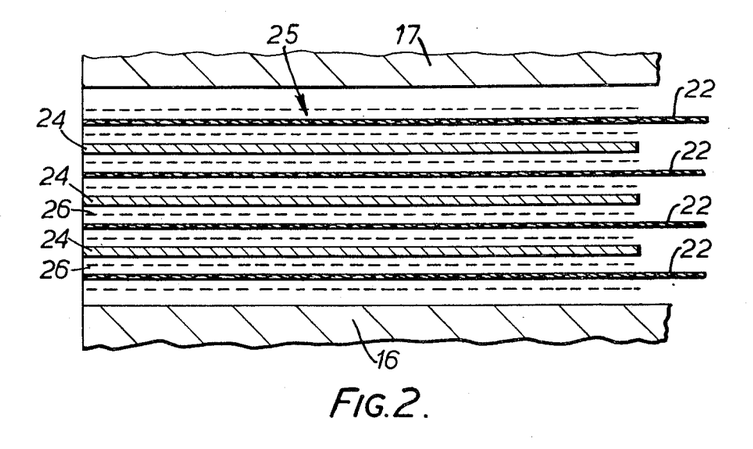
FIG. 2 is a detail of FIG. 1 on a larger scale.

An edge insert 21 in the interlayer 12 comprises four layers 22 of woven glass fiber cloth. To provide the four layers 22 two sheets 23 of woven glass fiber cloth are each doubled over and have their folded edges embedded in the marginal portion of the interlayer 12. The folded edges of the sheets 23 give a clean appearance where visible through the marginal portions of the laminated assembly. The layers 22 of glass fiber cloth extend beyond the outer edge of the interlayer 12. As more clearly shown in FIG. 2, the outer edges of the layers 22 are bonded together with interposed aluminum sheets 24 to form a rigid outer edge portion 25 on the insert 21. Bonding between the layers 22 and the aluminum sheets 24 is by means of epoxy resin 26 or similar bonding material. The rigid outer edge portion 25 of the insert 21 is located between the retaining ring 17 and a side mounting flange 27 on the base frame 16, the retaining ring 17 being riveted to the flange 27 through the rigid outer edge portion 25 of the insert 21. In the intermediate region where the layers 22 of the insert 21 extend through the silicone rubber sealing material 19 which seals the edges of the glass sheets 10 and 11 in the frame structure 15, the layers 22 are bonded together with silicone rubber to form a homogeneous sheet of silicone rubber and glass fibre material. Holes 28 drilled through the retaining ring 17, the flange 27 of the base frame 16 and the rigid edge portion 25 of the insert 21 provide for attachment of the assembly, by bolts 29, to an intermediate structural member 30 which forms part of the structure of the aircraft or other high speed vehicle.

In use, the glass sheet 13 comprises the outer component of the assembly and a thin transparent film of an electrically conductive material (e.g. gold) is provided on the inner surface of the glass sheet 13. The electrically conductive film provides for heating of the windscreen to a temperature selected to prevent the formation of ice on the outer surface of the sheet 13 and to provide for demisting of the inner surface of the windscreen. The heating provided by the electrically conductive film also maintains the polyvinyl butyral interlayers 12 and 14 above the temperature at which they become brittle. As the outer glass sheet 13 does not perform a major structural function it can be toughened to a lesser degree than the sheets 10, 11. This gives the advantage that should the sheet 13 alone be fractured by a minor impact it will not fracture into very small particles and consequently some residual vision through the windscreen will be maintained.

Figure 3:
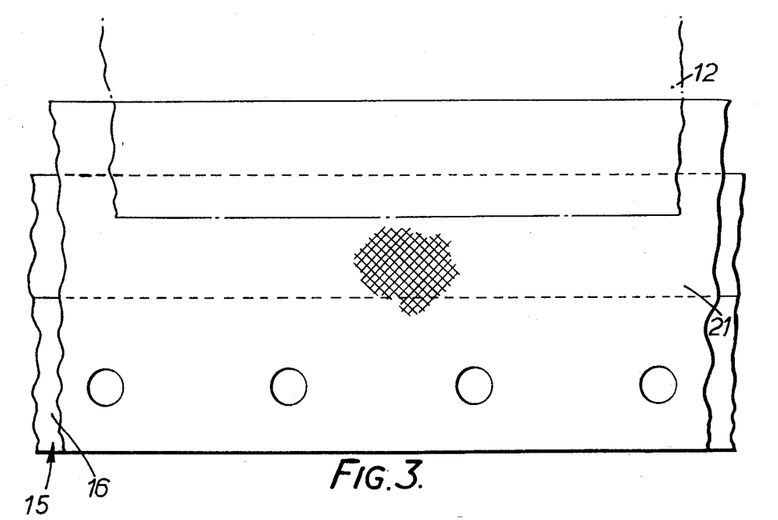

To provide a strong and reliable mounting of the assembly, it is essential that the insert 21 is strongly bonded into the marginal portion of the polyvinyl butyral interlayer 12. To achieve this end an adaptation of the conventional laminating technique is employed. The interlayer 12 is formed by laying down on the glass sheet 11 the requisite number of polyvinyl butyral sheets (for example of 0.635 mm in thickness) needed to make up the thickness of the interlayer 12. The two sheets 23 of woven glass fiber cloth for making up the insert 21 are cut from a suitable material, such as that manufactured by Turner Brothers Asbestos Company, Fiberglass Division, which is described as Woven Roving quality ECK 10, or that manufactured and sold by Fothergill and Harvey Limited under the description Y 737. These materials are suitable as they have a balanced construction, i.e. an approximately equal breaking strength in the directions of both the warp and the weft. As can be seen from FIG. 3 the material is cut so that the layers 22 in the insert 21 have the roving directions at 45° to the edges of the interlayer 12. Polyvinyl butyral strips are cut to a width equal to the required depth of insertion of the insert 21 into marginal portion of the interlayer 12 (e.g. 25 mm). The polyvinyl butyral strips are placed on the glass fiber sheets 23 adjacent the intended fold line and the sheets 23 are then folded over the polyvinyl butyral strips. The folded sheets 23 are clamped between blocks and are heated in an oven to approximately 100° C for a period of from 20 to 30 minutes resulting in bonding between the glass fiber and the polyvinyl butyral strips. To promote bonding, the areas of the glass fiber sheets 23 to be bonded to the polyvinyl butyral strips are first cleaned with a degreasing agent such as methyl ethyl ketone and are then painted with an adhesion promoting primer such as Y4310 manufactured by Union Carbide Limited. In laying down the polyvinyl butyral sheets to form the interlayer 12 the two sheets of polyvinyl butyral at the levels corresponding to the position of the glass fiber sheets 23 in the interlayer 12 are cut to a smaller size to allow the folded glass fiber sheets 23 to be placed in position. In addition one full sized polyvinyl butyral sheet is placed between the two folded glass fiber sheets 23. The external areas of the folded glass fiber sheets 23 which are to be bonded with the polyvinyl butyral of the interlayer 12 are also precleaned with a degreasing agent such as methyl ethyl ketone and are painted with an adhesion promoting primer, such as Y4310 mentioned above. The glass sheet 10 is laid on the built-up interlayer 12 and the interlayer 14 is then built up by laying a required number of polyvinyl butyral sheets on the glass sheet 10. Finally the glass sheet 13 is laid on the built-up interlayer 14. On completion the full assembly of the glass sheets 10, 11, 13 and the built-up interlayers 12 and 14 is inserted in a closed bag made of sheet material such as polyvinyl chloride and the bag is evacuated to extract all air from within the assembly. The assembly in the evacuated bag is then placed in an autoclave and is heated under pressure to effect lamination in known manner, e.g. at 140° C and a pressure of 91 Kg/cm². After completion of the laminating operation the assembly is removed from the bag and the layers 22 of the insert 21 which extend beyond the edges of the interlayer 12 are covered with masking tape at their outer ends in the region layer to be bonded with the aluminum sheets 24 to form the rigid outer edge portion 25 or the insert 21. The surfaces of the layers 22 between the masking tape and the interlayer 12 are then degreased with methyl ethyl ketone and are primed with an adhesion promoting agent such as the previously mentioned Y4310. The primed surfaces of the layers 22 are then painted with a room temperature vulcanising silicone rubber and the layers 22 are allowed to bond together to form a homogeneous sheet of silicone rubber and the glass fiber material. The masking tape is removed from the outer ends of the layers 22 and the exposed surfaces of the layers 22 are degreased with methyl ethyl ketone and are primed with a suitable adhesion promoting agent such as A 1100 manufactured by Union Carbide Limited. The aluminum sheets 24 are placed between the ends of the layers 22, each face of the aluminum sheets 24 being previously coated with epoxy resin after being degreased and coated with an adhesion promoting agent such as the previously mentioned A 1100 material. The ends of the layers 22 with the interposed aluminum sheets 24 are then clamped together until the epoxy resin has cured, thus bonding the ends of the layers 22 together to form the rigid outer edge portion 25 on the insert 21.

The assembly is then placed in the base frame 16 of the frame 15 and the retaining ring 17 of the frame structure 15 is riveted to the flange 27 of the base frame 16 with the rigid outer edge 25 of the insert 21 clamped therebetween. The interspace between the peripheral edges of the glass sheets 10, 11 and the frame 15 is filled with the silicone rubber sealing material 19 by injection moulding from either side of the insert 21 and finally the gap existing between the edges of the glass sheet 13 and the inner edge of the retaining ring 17 is filled with the polysulphide rubber sealing material 20.

FIGS. 4, 5, 6, 7 and 8 show alternative forms of windscreens in accordance with the invention.

Figure 4:
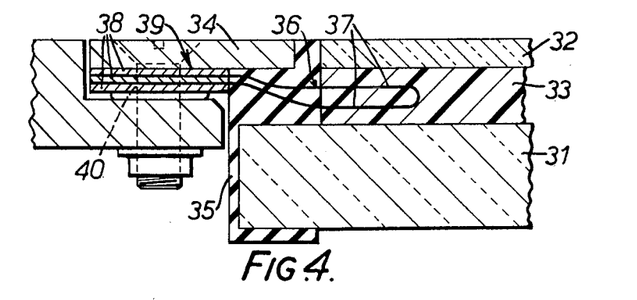

The assembly of FIG. 4 comprises a sheet 31 of soda-lime-silica glass which is 15 mm thick. The sheet 31 is toughened to the same degree by similar methods as for the sheets 10, 11 in the assembly of FIG. 1. The glass sheet 31 is bonded to an outer 4 mm thick glass sheet 32 by a 9 mm thick interlayer 33 of hard polyvinyl butyral. The edges of the outer glass sheet 32 and the interlayer 33 are set back with respect to the edges of the glass sheet 31 in order to form a rebate for reception of a surrounding frame member 34. The edges of the assembly are surrounded by a moulded silicone rubber sealing member 35. An edge insert 36 in the interlayer 33 comprises two layers 37 of woven glass fiber cloth formed by folding of a single sheet of glass fiber cloth. The folded edge of the sheet is bonded in the marginal portion of the interlayer 33. The layers 37 extend beyond the interlayer 33 through the sealing member 35 surrounding the edges of the assembly. Where the layers 37 extend through the sealing member 35 they are bonded in the member 35 and to one another by silicone rubber. The outer ends of the layers 37 which extend beyond the sealing member 35 are bonded together with two outer aluminum sheets and an intermediate aluminium sheet 38 to form a rigid outer edge portion 39 on the insert 36. Bonding between the layers 37 and the aluminium sheets 38 is by means of epoxy resin or similar material. Holes 40 drilled through the frame member 34 and the edge portion 39 of the insert provide for bolting of the assembly to a structural member 41 which forms part of the structure of an aircraft or other high speed vehicle.

Figure 5:
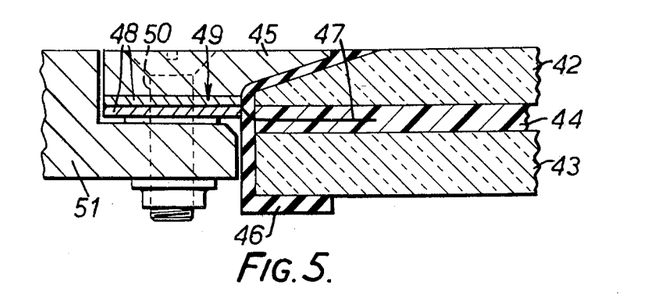

The assembly of FIG. 5 comprises two sheets 42, 43 of toughened soda-lime-silica glass which are both 10 mm thick. The glass sheets 42, 43 are bonded together by a 3 mm thick interlayer 44 of hard polyvinyl butyral. The edges of the glass sheet 42 are chamfered to fit the chamfered inner edges of a surrounding frame member 45. The edges of the assembly are surrounded by a moulded silicone rubber sealing member 46. An edge insert in the interlayer 44 comprises a single layer 47 of woven glass fiber cloth. The layer 47 is bonded at its inner edge in the marginal portion of the interlayer 44 and extends beyond the outer edge interlayer 44 through the sealing member 46 which surrounds the edges of the assembly. The outer marginal portion of the layer 47 which extends beyond the sealing member 46 is bonded between two aluminium sheets 48 to form a rigid outer edge portion 49 on the layer 47. Bonding between the aluminium sheets 48 and the layer 47 is by means of an epoxy resin or similar material. Holes 50 drilled through the frame member 45 and the edge portion 49 of the layer 47 provide for bolting of the assembly to a structural member 51 of the aircraft or high speed vehicle.

Figure 6:
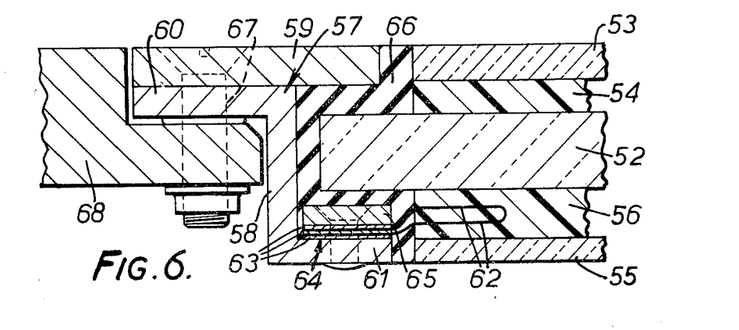

The assembly of FIG. 6 comprises a sheet 52 of toughened soda-lime-silica glass which is 12 mm thick. The glass sheet 52 is bonded to an outer 4 mm thick glass sheet 53 by a 4 mm thick interlayer 54 of polyvinyl butyral. The glass sheet 52 is also bonded to an inner 3 mm thick glass sheet 55 by a 6 mm thick interlayer 56 of polyvinyl butyral.

The laminated assembly of the glass sheets 52, 53, 55 and the interlayers 54, 56 is mounted in a surrounding frame structure 57. The frame structure 57, which is fabricated from aluminium alloy, comprises an inner frame member 58 and an outer retaining ring 59 which is riveted to an external flange 60 on the inner frame member 58. The edges of the outer sheet 53 and the interlayer 54 are set back with respect to the edges of the glass sheet 52 in order to form a rebate for reception of the inner edge of the retaining ring 59 of the frame structure 57. The edges of the inner glass sheet 55 and the interlayer 56 are also set back with respect to the edges of the glass sheet 52 to form a rebate for reception of an internal flange 61 of the inner frame member 58 of the frame structure 57.

An edge insert in the interlayer 56 comprises two layers 62 of woven glass fiber cloth formed by folding of a single sheet of glass fiber cloth. The folded edge of the sheet is bonded in the marginal portion of the interlayer 56. The layers 62 extend outwardly beyond the edge of interlayer 56 and the outer marginal portions of the layers 62 are bonded together with two outer aluminium sheets and an intermediate aluminium sheet 63 to form a rigid outer edge portion 64 on the insert. Bonding between the layers 62 and the aluminium sheets 63 is by means of epoxy resin or similar material. The rigid outer edge portion 64 of the insert is located between the internal flange 61 of the inner frame member 58 and a clamping ring 65 which is riveted to the flange 61 through the rigid outer edge portion 64 of the insert. The interspace between the edges of the assembly and the frame structure 57 is filled with silicone rubber sealing material 66. Holes 67 drilled through the retaining ring 59 and the external flange 60 of the inner frame member 58 provide for bolting of the assembly to a structural member 68 of the aircraft or other high speed vehicle.

Figure 7:
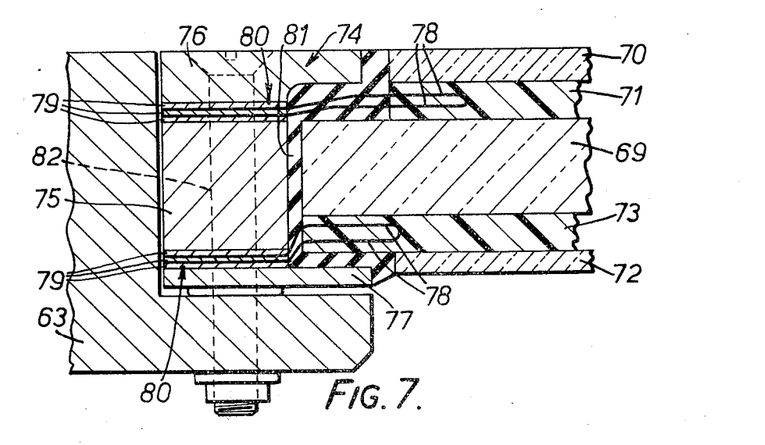

The assembly of FIG. 7 comprises a sheet 69 of toughened soda-lime-silica glass which is 15 mm thick. The glass sheet 69 is bonded to a 4 mm thick outer glass sheet 70 by a 5 mm thick interlayer 71 of polyvinyl butyral. The glass sheet 69 is also bonded to a 3 mm thick inner glass sheet 72 by a 5 mm thick interlayer 73 of polyvinyl butyral. The laminated assembly of the glass sheets 69, 70, 72 and the interlayers 71, 73 is mounted in a surrounding frame structure 74. The frame structure 74, which is fabricated from aluminium alloy, comprises a central frame member 75, an outer retaining ring 76 and an inner retaining ring 77. The edges of the outer glass sheet 70 and the interlayer 71 are set back with respect to the edges of the glass sheet 69 in order to form a rebate for reception of the inner edge of the outer retaining ring 76 of the frame structure 74. The edges of the inner glass sheet 72 and the interlayer 73 are also set back with respect to the edges of the glass sheet 69 in order to form a rebate for reception of the inner edge of the inner retaining ring 77 of the frame structure 74.

An edge insert in the interlayer 71 comprises two layers 78 of woven glass fiber cloth, formed by felding of a single sheet of glass fiber cloth. The folded edge of the sheet is bonded in the marginal portion of the interlayer 71 and the layers 78 extend outwardly beyond the interlayer 71. Likewise an edge insert in the interlayer 73 comprises two layers 78 of woven glass fiber cloth formed by folding of a single sheet of glass fiber cloth. The folded edge of the sheet is bonded in the marginal portion of the interlayer 73 and the layers 78 extend outwardly beyond the interlayer 73. The outer marginal portions of the layers 78 in the two edge inserts are bonded together with two outer aluminium sheets and an intermediate aluminium sheet 79 to form a rigid outer edge portion 80 on each of the edge inserts. The rigid outer edge portions 80 of the edge inserts are located one on either side of the central frame member 75 of the frame stucture 74 and trapped between the outer and inner retaining rings 76 and 77 thereof. The retaining rings 76, 77 and the central frame member 75 of the frame structure 76 are riveted together through the outer edge portions 80 of the edge inserts. The interspace between the edges of the assembly and the frame structure 74 is filled with silicone rubber sealing material 81. Where the layers 78 of the edge inserts extend through the sealing material 81 they are bonded to each other by silicone rubber. Holes 82 drilled through the outer retaining ring 76, the central frame member 75 and the inner retaining ring 77 provide for bolting of the assembly to a structural member 83 of the aircraft or other high speed vehicle.

Figure 8:
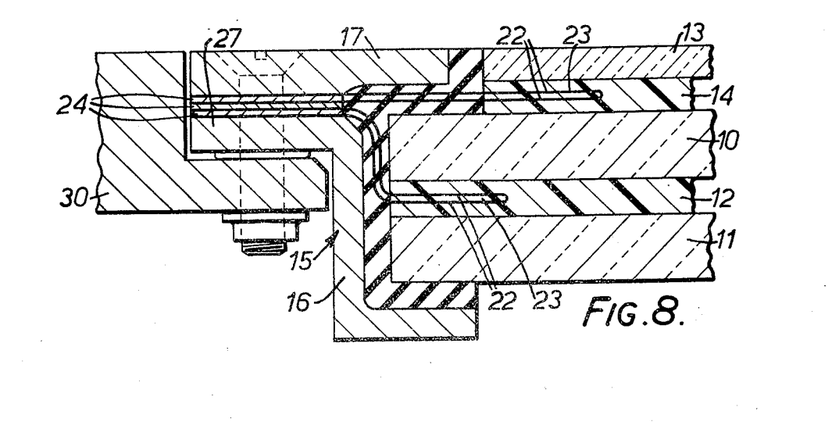

FIG. 8 shows an assembly generally similar to that of FIG. 1 and corresponding parts in FIG. 8 are referred to by the same reference numerals as in the description of FIG. 1. In FIG. 8, however, one of the folded sheets 23 of woven glass fiber cloth has its inner folded edge embedded in the outer marginal portion of the interlayer 14 and the other of the sheets 23 has its inner folded edge embedded in the outer marginal portion of the interlayer 12. As in the arrangement of FIG. 1 the four layers 22 formed by the two sheets 23 are bonded together at their outer marginal portions with interposed aluminium sheets 24 to form a rigid outer edge portion 25 on the insert 21, the outer edge portion 25 of the insert being riveted between the retaining ring 17 and the side mounting flange 27 of the base frame 16.

Figure 9:
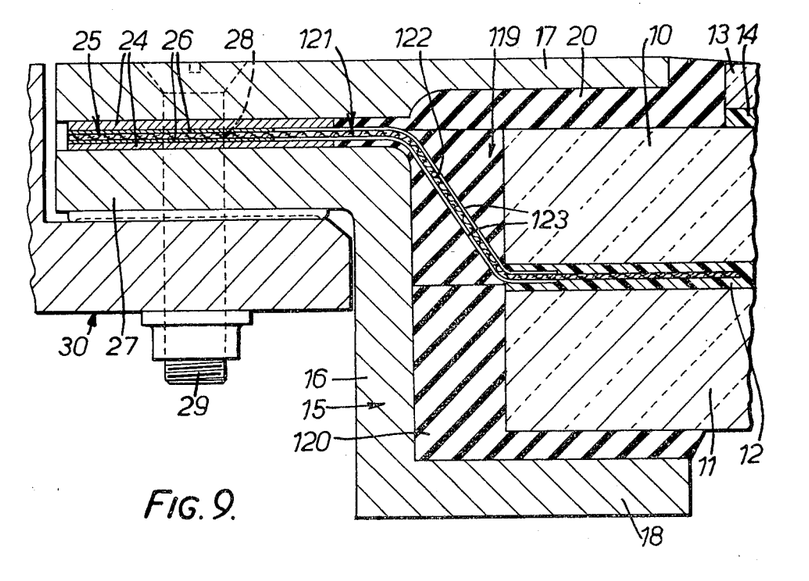
FIG. 9 is a section similar to FIG. 1 through an edge portion of a preferred form of laminated glass assembly in accordance with the invention.
Figure 10:
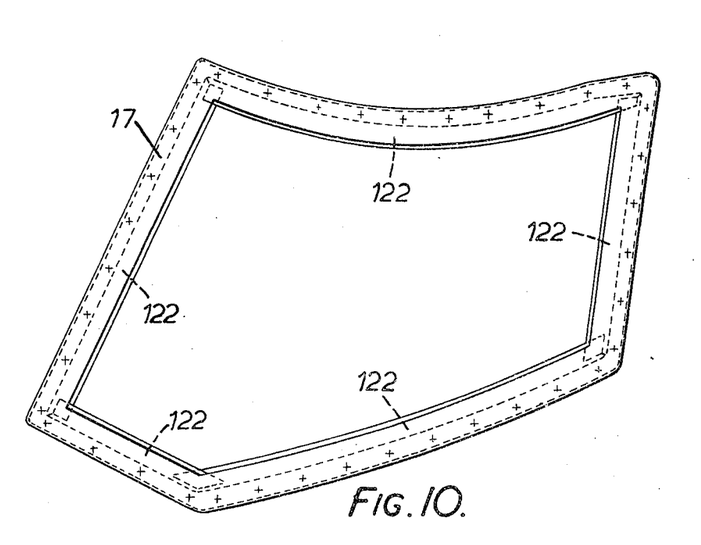
FIG. 10 is an elevation of the complete assembly of FIG. 9.
Figure 11:
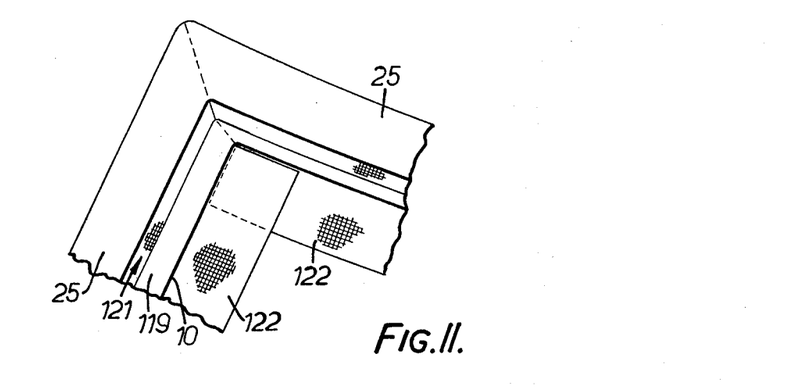
FIG. 11 is a detail view, in elevation, of one corner of the assembly of FIG. 9, at an intermediate stage of construction.

The example illustrated in FIGS. 9 to 11 involves the use of an insert of a fabric woven from rubber-impregnated glass fiber cords and nylon, of the form described below. Referring to FIG. 9, the laminated assembly is generally similar to that of FIG. 1 and comprises two similarly shaped sheets 10, 11 of soda-lime-silica glass which are both 12 mm thick and are bonded together by a 7.5 mm thick interlayer 12 of hard polyvinylbutyral therebetween. Each sheet 10, 11 is toughened as described above in connection with the embodiment of FIG. 1. The sheet 10 is also bonded to an additional glass sheet 13 by a 3 mm thick interlayer 14 of hard polyvinylbutyral, the sheet 13 also being toughened as described above in connection with FIG. 1. The laminated assembly of the glass sheets 10, 11, 13 and the polyvinylbutyral interlayers 12, 14 is mounted in a surrounding frame structure 15. The frame structure 15, which is fabricated from aluminium alloy, comprises an inner base frame 16 and an outer retaining ring 17.

The peripheral edges of the glass sheets 10 and 11 fit in the frame structure 15 between the retaining ring 17 and an inwardly extending flange 18 of the base frame 16. The edges of the glass sheet 13 and the interlayer 14 are set back with respect to the edges of the glass sheet 10 in order to form a rebate for reception of the inner edge of the retaining ring 17.

An edge insert 121 in the interlayer 12 comprises a single sheet 122 of woven glass fiber/nylon fabric. Each surface of the sheet 122 is coated with a thin (0.15 inch) layer 123 of soft polyvinyl butyral. The layers 123 terminate short of the inner and outer edges of the sheet 122, the inner edges of the layers 123 being partially embedded with the inner edge of the sheet 122 in the marginal portion of the interlayer 12. The outer edge of the sheet 122 is bonded between two aluminium sheets 24 to form a rigid outer edge portion 25 on the insert 121. The layers 123 of soft polyvinyl butyral extend far enough towards the outer edge of the sheet 122 so that the outer edges of the layers 123 are trapped between the inner edges of the aluminium sheets 24. Bonding between the sheet 122 and the aluminium sheets 24 is by means of epoxy resin 26 or similar bonding material. The rigid outer edge portion 25 of the insert 121 is located between the retaining ring 17 and a side mounting flange 27 on the base frame 16, the retaining ring 17 being attached to the flange 27 through the rigid outer edge portion 25 of the insert 121 by rivets (not shown). A block 119 of polysulphide rubber, which is premoulded on the intermediate part of the insert 121, fits in the interspace existing between the peripheral edges of the glass sheet 10 and the base frame 16. The gap between the retaining ring 17 and the edges of the glass sheet 10 is filled with injection moulded polysulphide rubber 20 which also bonds between the edges of the glass sheet 13 and the retaining ring 17 to form a weather seal. The gap between the edges of the glass sheet 11 and the base frame 16 is also filled with injection moulded polysulphide rubber 120.

Holes 28 are drilled through the retaining ring 17, the flange 27 of the base frame 16 and the rigid edge portion 25 of the insert 21 to provide for attachment of the assembly by bolts 29 to an intermediate structural member 30 of the aircraft or other vehicle.

As previously mentioned the insert 121 is made from a fabric woven from glass fiber and nylon. The fabric has a warp fo rubber-impregnated glass fiber cord material such as that manufactured by Fiberglass Limited and referenced E.C.9 34-3/3. Each cord of this material comprises nine strands composed of continuous glass fiber filaments, each strand being impregnated with a rubber latex compound, which coats each of the individual glass filaments in the strand. The strands are twisted together in groups of three, the three groups then being twisted together to form a composite glass fiber/rubber cord.

The nominal twist, i.e. the average number of turns per meter of the individual groups of three strands in the composite cord is 142. The means percentage loss on ignition, which is a measure of the overall amount of rubber compound in the composite cord, being the percentage weight loss which occurs when the rubber compound is burned off, is 18%. The composite cord has a nominal break strength of 25 Kg, ultimate elongation of 3.5 to 4.0% and diameter of 0.56 mm. The linear density, i.e. the weight in grams of 1000 meters of the material is 400 and the catenary, i.e. the difference in length between the shortest and longest individual strand in 25 centimeters of the composite cord, is 1.5 mm.

The woven fabric has 20 rubber impregnated glass fiber cords per inch of the weft, the weft consisting of approximately 18 strands per inch of 4 fold, 70 denier textured nylon.

Figure 12:
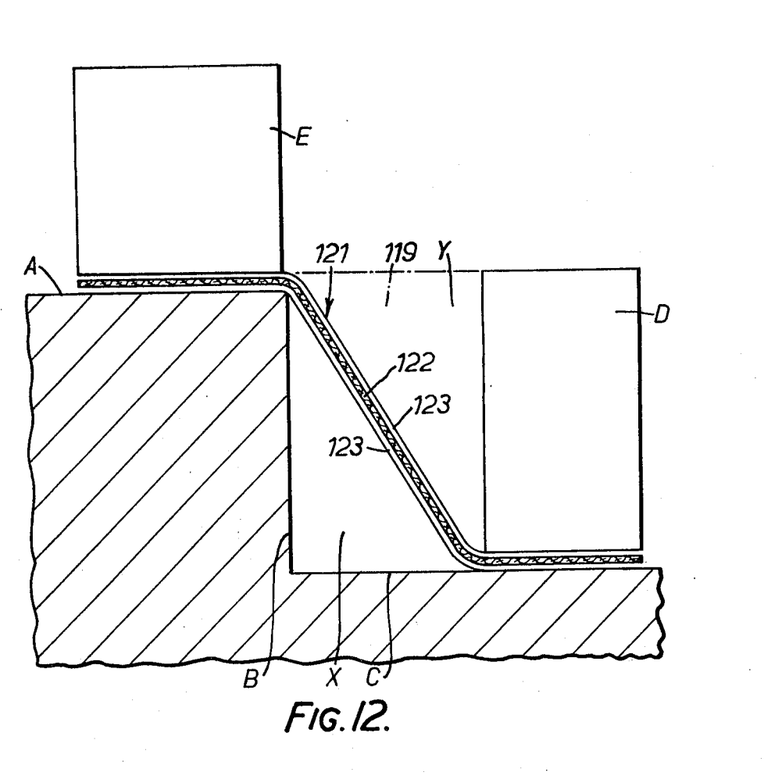
FIG. 12 is a diagrammatic sectional view illustrating an intermediate stage in the construction of the assembly of FIGS. 9 to 11.

The procedure for fabrication of the insert 121 and its assembly in the windscreen is as follows:

Separate elongated sheets 122 of the woven fabric are cut out, of the sizes and shapes to suit the respective edges of the windscreen. In the particular example illustrated in FIG. 10, there are five such sheets 122. As shown in FIG. 11, the fabric is cut so that the rubber impregnated glass fiber cords will extend perpendicular to the respective edges of the windscreen, with a permissible variation of ± 15°. At the corners of the windscreen, the inner portions of the ends of the sheets 122 are overlapped where they will lie within the interlayer 12 and the outer portions are mitred to fit in abutting relationship where they will lie outside the interlayer 12, as illustrated in FIGS. 10 and 11. To facilitate cutting of the fabric and to prevent fraying of the edges of he cut piece a polyvinyl butyral lacquer is applied to the fabric prior to cutting. Sheets of soft polyvinyl butyral for making up the layers 123 on the surfaces of the sheets 122 of woven fabric are cut to shape and are placed on either side of the sheets 122. The sandwich of the sheets 122 and the sheets of soft polyvinyl butyral is placed between glass platens and the whole assembly is put in a closed bag of sheet material such as polyvinyl chloride and the bag is evacuated. The assembly in the evacuated bag is placed in an oven and heated for example at 70° C for 30 minutes. This procedure bonds the sheets of soft polyvinyl butyral to the surfaces of the sheets 122 of woven fabric to form the layers 123 of soft polyvinyl butyral on the surfaces of the sheets 122, and joins the sheets 122 at their ends to form the continuous insert 121. The insert 121 is then placed in a jig of the form shown in FIG. 12. The jig is of stepped profile having an upper horizontal face A, a vertical face B and a lower horizontal face C. The edges of the sheets 122 which are to be embedded in the marginal portion of the interlayer 12 of the windscreen are clamped between the lower face C of the jig and a clamping block D. In order to form the premoulded block 119 of polysulphide rubber on the insert 121, a polysulphide rubber compound such as Thiokol PR 1221 manufactured by British Paints Limited is injected into the space X between each sheet 122 and the vertical face B of the jig, the upper edge of the sheet 122 being lifted to provide access to the space X. The upper edge of the sheet 122 is then clamped between the upper face A of the jig and a clamping block E. Polysulphide rubber compound is injected into the space Y between the sheet 122 and the adjacent vertical face of the clamping block D. The whole assembly is placed in an oven and the polysulphide rubber is cured by heating to 70° C for 2 hours. The clamping block E is removed and the aluminium sheets 24 are bonded to the free edge of the sheets 122 to form the rigid outer edge portions 25 on the insert 121. The aluminium sheets 24 are placed one on either side of the edge of each sheet 122, the faces of the aluminium sheets 24 which are to be bonded to the edge of the sheet 122 being previously coated with epoxy resin after being degreased with methyl ethyl ketone and coated with an adhesion promoting agent such as A1100 manufactured by Union Carbide Limited. The aluminium sheets 24 with the interposed edge of the sheet 122 are clamped between the upper face A of the jig and the clamping block E until the epoxy resin has cured, thus bonding the aluminium sheets 24 and the edge of the interlayer together to form the rigid outer edge portions 25 on the insert 121.

The insert 121 is removed from the jig for assembly with the windscreen. The interlayer 12 is formed by laying down on the glass sheet 11 the requisite number of polyvinyl butyral sheets (for example 0.635 mm in thickness) needed to make up the interlayer 12. In laying down the polyvinyl butyral sheets to form the interlayer 12 the edge of the insert 121 which is to be embedded in the peripheral margin of the interlayer 12 is interleaved at a suitable level between the edges of the polyvinyl butyral sheets. The edge of the insert 121 which is to be bonded with the polyvinyl butyral of the interlayer 12 is precleaned with a degreasing agent such as methyl ethyl ketone and is painted with an adhesion promoting primer such as Y4310 manufactured by Union Carbide Limited. The glass sheet 10 is laid on the built up interlayer 12 and the assembly of the glass sheets 10, 11, the built up interlayer 12 and the insert 121 is inserted in a closed bag made of sheet plastic material such as polyvinyl chloride and the bag is evacuated to extract all air from within the assembly. The assembly within the evacuated bag is placed in an autoclave and is heated under pressure to effect lamination in known manner e.g. at 140° C and 100 p.s.i. After completion of this laminating operation the assembly is removed from the bag and the interlayer 14 is built up by laying a requisite number of polyvinyl butyral sheets on the glass sheet 10. The glass sheet 13 is laid on the built up interlayer 14 and lamination of the sheet 13 is effected in the manner described above for lamination of the sheets 10 and 11.

The assembly is placed in the base frame 16 of the frame 15 with the rubber block 119 of the insert 121 located between the edge of the glass sheet 10 and the base frame 16. The retaining ring 17 of the frame 15 is riveted to the flange 27 of the base frame 16 with the rigid outer edge portions 25 of the insert 121 clamped therebetween. Finally the gap between the retaining ring 17 and the edges of the glass sheets 10 and 13 is filled with polysulphide rubber 20 by injection molding and the gap between the edges of the glass sheet 11 and the base frame 16 is similarly filled with the polysulphide rubber 120 by injection moulding.

The insert 121 provides a strong connection between the laminated glass panel 10, 11, 12, 13, 14 and the surrounding frame structure 15, while the low heat conductivity and the flexibility of the insert reduce to a minimum the production of thermal and mechanical stresses. The fabric woven from rubber-impregnated glass fibre cords and nylon is especially suitable for this purpose because it has a high strength in the direction of the glass fibre cords and it bonds well into the polyvinyl butyral interlayer 12 and the laminated edge portion 25, and it is substantially unaffected by vibrations of the type generally experienced on aircraft. The provision of the layers 123 of soft polyvinyl butyral on the surfaces of the sheets 122, extending into the edges of the interlayer 12 and of the rigid edge portion 25, helps to cushion the effect of stresses acting on the insert 121, e.g. where it is embedded in the rubber block 119, and particularly where the insert 121 is bent on its entry into the interlayer 12 and into the edge portion 25. The layers 123 are particularly useful in helping to avoid concentration of stresses at the locations where the insert is bent.

An insert of rubber-impregnated glass fibre/nylon fabric of the kind described in connection with FIGS. 9 to 12 can also be used in any of the embodiments of FIGS. 1 to 8 in place of the inserts of woven glass fibre cloth referenced 21 (FIGS. 1 and 8), 36 (FIG. 4), 47 (FIG. 5), 62 (FIG. 6), and 78 (FIG. 7). The nylon weft is not required to contribute substantially to the strength of the fabric, and may indeed be omitted entirely, a sheet formed of the rubber-impregnated glass fibre cords laid substantially parallel to one another being then embedded between the layers 123 of soft polyvinyl butyral.

We claim:

1. In a laminated transparent assembly suitable for use as a windscreen in a high speed vehicle such as an aircraft, the assembly comprising a load bearing sheet of toughened glass having a second sheet of glass laminated thereto by means of an impact resistant interlayer of plastics material and an insert which is partially embedded in and extends around the periphery of the interlayer, the improvement comprising utilizing an insert of high tensile strength fibrous material having an inner flexible portion of the insert embedded in the outer marginal portion of the interlayer, an intermediate flexible portion of the insert adjacent to and extending outwardly from the edges of the interlayer to ensure flexibility in the attachment of the assembly to the structure of the vehicle and outer marginal portion of the insert which is reinforced to provide for said attachment of the assembly to the structure of the vehicle.

2. A laminated transparent assembly as claimed in claim 1 wherein the insert is of a non-metallic material having a low thermal conductivity.

3. A laminated transparent assembly as claimed in claim 1 wherein the insert comprises a sheet of fabric material.

4. A laminated transparent assembly as claimed in claim 3, wherein the insert comprises a sheet of a fabric woven from rubber-impregnated glass fibre cords and nylon, which is located in the assembly so that the impregnated glass fibre cords make an angle of 90° ± 15° with the adjacent edges of the assembly.

5. A laminated transparent assembly as claimed in claim 3, wherein the insert comprises a sheet formed of rubber-impregnated glass fibre cords laid substantially parallel to one another, which is located in the assembly so that the glass fibre cords make an angle of 90° ± 15° with the adjacent edges of the assembly.

6. A laminated transparent assembly as claimed in claim 4, wherein the sheet is provided on each side with a layer of plastics material softer than the material of the interlayer.

7. A laminated transparent assembly as claimed in claim 6, wherein the material of the interlayer and of the layers on each side of the fabric sheet are polyvinylbutyral.

8. A laminated transparent assembly as claimed in claim 3, wherein the insert comprises at least one sheet of woven glass fibre material.

9. A laminated transparent assembly as claimed in claim 8, wherein the woven glass fibre material has substantially equal strengths in both the weft and warp directions and is located in the assembly so that these directions make angles of substantially 45° with the adjacent edges of the assembly.

10. A laminated transparent assembly as claimed in claim 3, wherein the reinforced outer marginal portion of the fabric sheet is formed into a rigid composite laminate to provide the means for attachment of the assembly to the structure of the vehicle.

11. A laminated transparent assembly as claimed in claim 10, wherein the reinforced outer marginal portion of the fabric sheet is laminated together with sheets of metal.

12. A laminated transparent vehicle windscreen assembly as claimed in claim 10 wherein the assembly is mounted in a surrounding frame structure so as to define an interspace between the edges of the assembly and a facing inner surface of the frame structure, the laminated reinforced outer marginal portion of the fabric sheet being attached to the frame structure, which provides for attachment of the assembly to the structure of the vehicle.

13. A laminated transparent windscreen assembly as claimed in claim 12, wherein the frame structure comprises a support frame and a retaining member together defining a channel in the frame structure housing the edges of the assembly, said interspace being defined between the edges of the assembly and the channel in the frame structure, said interspace being filled with elastomeric sealing material, the laminated outer marginal portion of the fabric sheet being rigidly clamped between the support frame and the retaining member of the frame structure.

14. A laminated transparent windscreen assembly as claimed in claim 12, wherein the intermediate flexible portion of the insert is disposed at an angle to the embedded inner part and to the rigid outer marginal portion, which are parallel to one another.

15. A laminated transparent assembly as claimed in claim 13, wherein the intermediate flexible portion of the insert is embedded in a block of elastomeric material.

16. A laminated transparent assembly according to claim 1, comprising three sheets of glass laminated together by means of two interlayers of plastics material, wherein two of said inserts of high tensile strength fibrous material are provided, one insert being embedded in the outermost marginal portion of each interlayer.

17. A laminated transparent assembly according to claim 16, wherein the outer marginal portions of the fabric sheets of the two inserts are formed into separate rigid composite laminates to provide means for attachment of the assembly to the vehicle structure.

18. A laminated transparent assembly according to claim 16, wherein the outer marginal portions of the fabric sheets of the two inserts are reinforced and formed into a single rigid composite laminate to provide means for attachment of the assembly to the vehicle structure.

* * * * *